(No Model.) 2 Sheets—Sheet 1.

J. A. JOHNSON.
POWER TRANSMITTER.

No. 523,429. Patented July 24, 1894.

Witnesses
W. C. Coolies
R. C. Page

Inventor
John A. Johnson
By H. F. Palmer
Atty

THE NORRIS PETERS CO., PHOTO-LITHO., WASHINGTON, D. C.

(No Model.) 2 Sheets—Sheet 2.
J. A. JOHNSON.
POWER TRANSMITTER.
No. 523,429. Patented July 24, 1894.
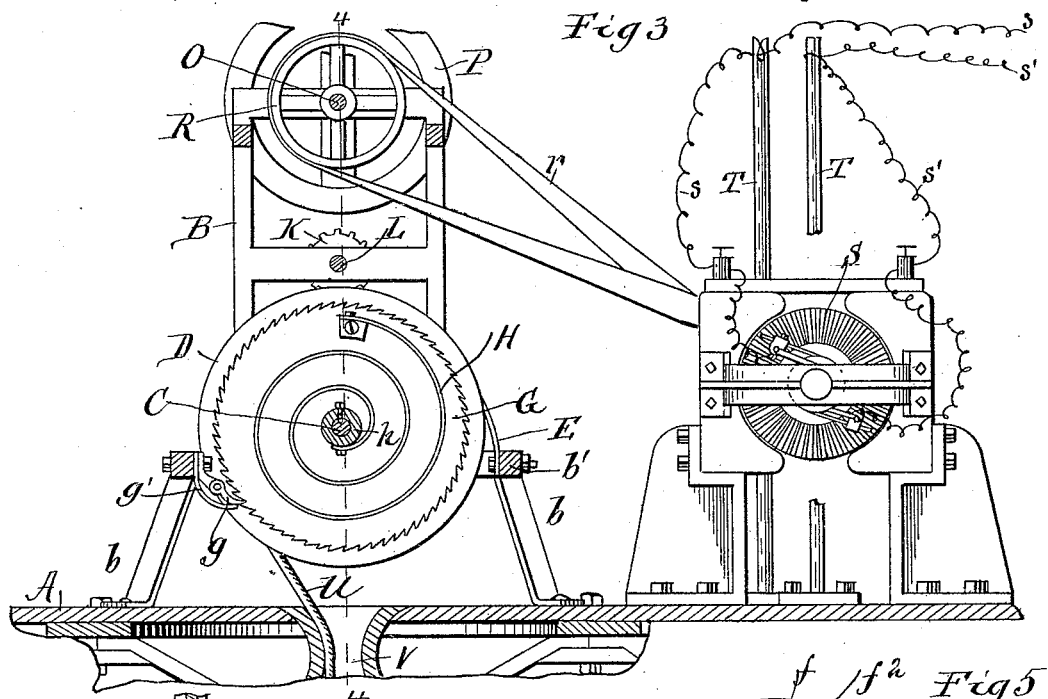
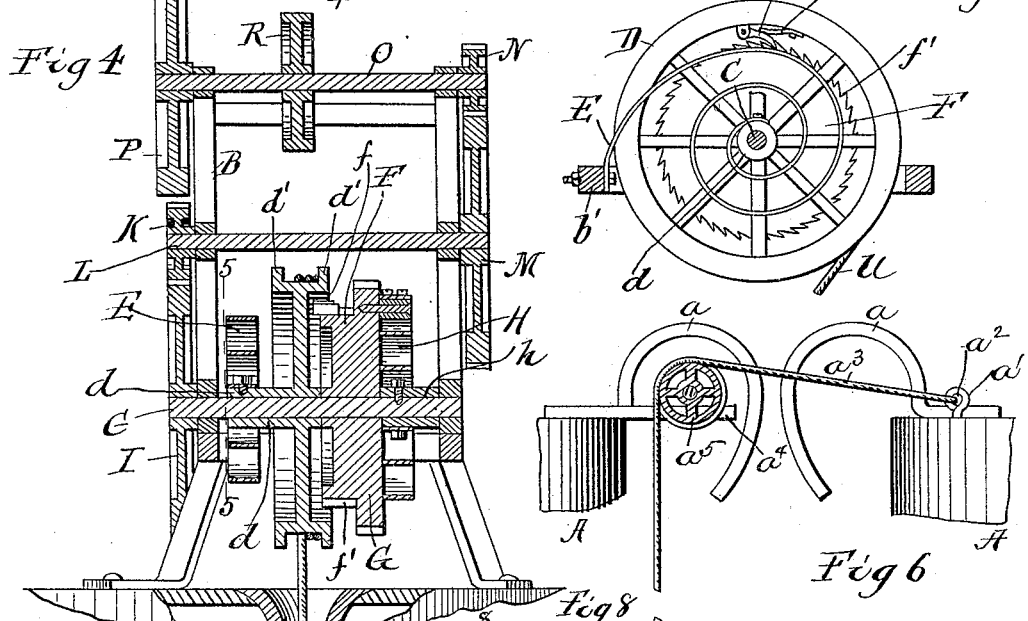
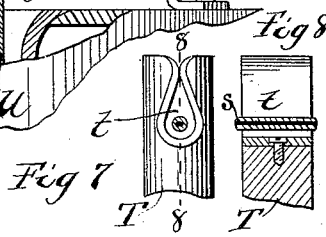
Witnesses
Inventor
John A. Johnson
By H. H. Palmer
Atty.

UNITED STATES PATENT OFFICE.

JOHN A. JOHNSON, OF CHICAGO, ILLINOIS.

POWER-TRANSMITTER.

SPECIFICATION forming part of Letters Patent No. 523,429, dated July 24, 1894.

Application filed June 6, 1893. Serial No. 476,745. (No model.)

*To all whom it may concern:*

Be it known that I, JOHN A. JOHNSON, a citizen of the United States, residing at Chicago, in the county of Cook and State of Illinois, have invented a certain new and useful Improvement in Power-Transmitters, which is fully set forth in the following specification, reference being had to the accompanying drawings, in which—

Figure 1:
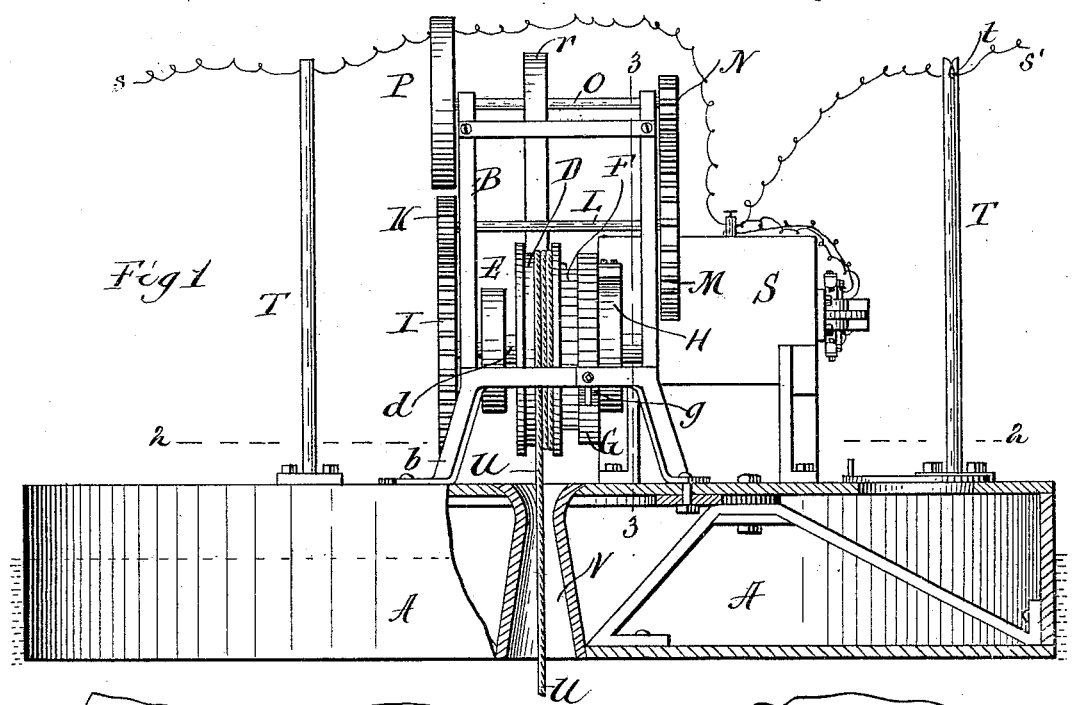
Figure 2:
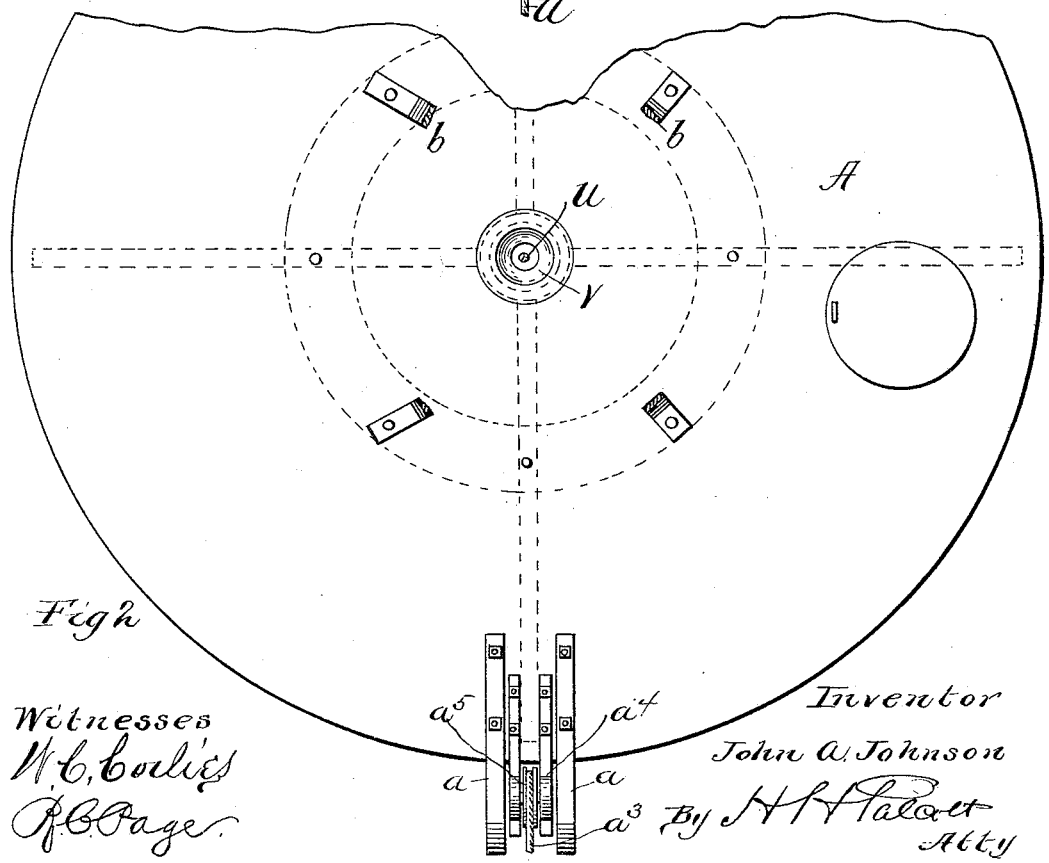

Figure 1 represents a side elevation of a float with my improved power transmitter secured thereto. Fig. 2 represents a detailed plan section of the same, taken at the line 2—2, Fig. 1. Fig. 3 represents a detailed, vertical section of the same, taken at the line 3—3, Fig. 1. Fig. 4 represents a detailed section, taken at the line 4—4, Fig. 3. Fig. 5 is a detailed section of one of the winding-springs, taken at the line 5—5, Fig. 4. Fig. 6 is a detailed section, showing the method of attaching two floats together. Fig. 7 is a detailed elevation of one of the electric wire supporting arms; and, Fig. 8, is a detailed section of the same.

My invention relates to devices so constructed and arranged as to afford a medium through and by which power caused by the waves or volume of water as it is alternately raised above or depressed below the surface by action of the wind or tides of the sea, or other causes—may be transmitted to a dynamo by which an electric current, or currents, may be generated by the revolution of an armature in a magnetic field. The electric current so developed is conveyed to storage batteries conveniently located on the shore, and from which electricity may be distributed or taken for the various purposes for which it is desired.

My invention consists in the combination and arrangement of the devices hereinafter described.

In the accompanying drawings, I have shown one means by which such wave power may be transmitted; and this means I will now particularly describe. But I do not wish to restrict or confine my invention to the precise means shown; other devices capable of accomplishing the object, that is, of utilizing the power of waves in operating a dynamo, may be used.

In the drawings, A represents a float, to the upper surface of which are secured the hereinafter described devices. There may be one or more of these floats, all of which are alike in their construction.

The float A may be of any suitable form or any desired size, or may be made of any suitable material. I have shown one circular in form. The float A is hollow and is of sufficient width and depth to float easily, and is properly braced, so that it may securely sustain the hereinafter described devices. To the ends of the floats A, or at the points where it is desired to secure the floats to each other, are curved, flat springs, or bumpers, $a$, one end of which is properly fastened to the upper edge of the float A, the free ends curving outwardly and downwardly and in such a manner that the outer surface of one spring will strike the corresponding surface of the other spring, thus forming bumpers for the floats A, the office of which is to prevent the sides or ends of the different floats from rubbing together.

The different floats are secured to each other in the following manner: At or near the springs $a$ there is secured to the upper surface of the float A, a staple, $a'$, having an eye, $a^2$, in which is secured a rope, $a^3$. On the adjacent float and at or near its bumper $a$, are secured brackets, $a^4$, between which is suitably journaled the sheave-wheel, $a^5$, over which the rope $a^3$ passes. At the other end of the rope $a^3$ is secured a weight, $a^6$, which should be heavy enough to hold the floats as near to each other as may be desired. These floats are secured or held in position by a rope passing through the opening, V, and anchored as herein particularly described. These floats may be located at any distance from the shore, as may be desired. The floats are all alike, as before stated. To each of these floats is secured a power transmitter, all of which are alike in their construction and mode of operation, and a description of one will suffice for all. This power transmitter consists of a frame B, having legs, $b$, securely fastened to the upper surface of the float A. A shaft, C, has its bearings in the lower part of the frame B. On the shaft C is loosely mounted the drum, D, having a hub, $d$, projecting from one side of the drum, and forming a sleeve on the shaft C. On each of the outer edges of the drum D are flanges, $d'$.

E, is a flat, helical spring, the outer end of which is secured in any suitable manner to the cross-piece, $b'$, of the frame B, and the inner end is secured in like manner to the sleeve $d$. When the drum D is revolved by force, the spring E is wound up, and whenever the winding force ceases, the drum is revolved in an opposite direction by the action of the spring in unwinding. On the side of the drum, opposite the spring E, is a ratchet-wheel composed of two smaller ratchet-wheels formed out of one piece of metal, or two pieces rigidly secured to each other. F represents the smaller of these ratchets, the inner end of which is located within the drum D, within the hollow of which it may and does revolve. G, is the outer and larger of these ratchet-wheels. It is of about the same diameter as the drum D.

Within the periphery of the drum D, and directly under one of the flanges $d'$, is suitably secured a dog, $f$, so secured and arranged that whenever the drum D is revolved, as hereinafter stated, the dog $f$ engages with the ratchet-teeth, $f'$, of the ratchet-wheel F, and revolves said ratchet-wheel, and at the same time the ratchet-wheel G revolves with it. The dog $f$ is held in engagement with the ratchet-teeth $f'$ by a small, flat spring, $f^2$, shown in Fig. 5. Whenever the force or power which revolves the drum D ceases, the spring E causes the drum D to turn back to its place, as before stated, and it is evident that the dog $f$ will be withdrawn from its contact with the teeth of the ratchet-wheel F. To hold the ratchet-wheels F and G in place, and prevent them from revolving back with the drum D, I have secured a dog, $g$, to the under side of the cross-piece $b'$ of the frame B, in such manner as to allow the ratchet to turn with the drum, as above stated, but when the drum is turned in a contrary direction, the dog $g$ engages with the teeth on the ratchet-wheel G and prevents it from turning, as before stated. The dog $g$ is held in engagement with the ratchet-teeth by a flat spring, $g'$, suitably and properly secured. The ratchet-wheels F and G are loosely mounted on the shaft C.

H, is a flat, helical spring, the outer end of which is suitably secured to the side of the ratchet-wheel G, near its circumference, as shown in Fig. 3. The inner end of this spring is secured by some suitable method to the sleeve, $h$, which is rigidly secured to the shaft C.

It will be seen that the force which revolves the ratchets F and G will coil up the spring H, and when this force ceases the spring H will unwind and will tend to revolve the shaft C in the direction desired. On the opposite and outer end of the shaft C is rigidly mounted the cog-wheel, I, the teeth of which mesh with the teeth of the pinion, K, rigidly mounted on the shaft L, at the opposite end of which is mounted the cog-wheel, M, the teeth of which mesh with the teeth of the pinion, N, rigidly mounted on the shaft O.

I and K are in the same vertical plane, as are also M and N.

The drum, ratchets, cog-wheels, and their accompanying devices are all preferably of metal.

At the opposite end of the shaft O, I have shown a balance-wheel, P, also of metal.

R, is a pulley, which I have shown mounted on the shaft O. Midway between the wheel P and pinion N, a belt, $r$, connects the pulley R with a corresponding device, or the device by which the dynamo S is operated.

I have shown a method by which force can be transmitted to a dynamo, but I do not wish to be understood as limiting myself to the precise arrangement shown in the drawings.

The dynamo, S, may be of the construction here shown, or of any other well-known construction, and it need not be described here. It has the brushes, commutator, and other usual accessories of such machines. It is secured to the float A in any manner desired to accomplish such object. The conducting-wires $s-s'$, lead from the dynamo S to the storage batteries, located on the shore, and from which electricity may be distributed, as desired. These batteries are no part of my invention, and are not shown in the drawings.

As before stated, there may be any number of floats. It will always be desirable to use two or more.

For the purpose of sustaining and holding the wires $s-s'$, I employ posts, T, slitted at the top, with the bottom of the opening, or slit, enlarged, at $t$, as shown in Fig. 7. This opening is lined with a non-conducting substance, and the conducting-wire lies, ordinarily, in the enlarged part of the opening. In case, however, of a violent agitation of the water or of the floats—such as would cause injury to the conducting-wires if they were rigidly secured to the post T—the violent action will throw the wire out of the opening in the post T, and currents from the dynamos on the remaining floats will not be disturbed. The posts are rigidly and properly secured to the floats A, made of any suitable material. Secured near the top of the drum D as it is held in position by the spring E, is a cable, U, made of finely-twisted strands of wire, properly and suitably protected, so that the water will not injure them. The rope U is secured at such a point on the drum D between the flanges $d'$, that a downward force exerted on the rope, will revolve it in a direction which will coil or wind up the springs E and H. The rope or cable U passes downward, through an opening V in the float A, and through the water on which the float rests, where it is firmly secured by any suitable means.

It is evident that the rising and falling of the waves will impart a rising and falling motion to the float A and frame B, with the above described devices secured to it, the rope U, being held firmly at its lower end by its anchor, will pull down on the drum D, and cause it to revolve; and through the devices hereinbefore described, power through suitable means is imparted to the dynamo S, and a current of electricity is developed.

Rapid motion having been imparted to the balance or fly-wheel P by the action of the rope U in revolving the drum D in such a direction as will wind the spring H, the momentum of the wheel P, as well as the unwinding of the spring H, will continue to impart motion to the pulley O when the waves recede. It is evident that the more rapidly the different waves succeed each other, the stronger will be the electric currents generated.

Having thus described my invention, what I claim, and desire to secure by Letters Patent, is—

1. The combination of a dynamo with a pulley thereto attached for rotating the electromagnet or armature, with a float so constructed as to be capable of sustaining said dynamo; and a power transmitter having a shaft journaled in the frame thereof with a drum loosely mounted on said shaft with a sleeve or hub rigidly secured to said drum and forming part of the same; and a helical spring secured to said hub and so arranged as to be capable of being wound up when the drum is revolved by action of the waves, and of unwinding and revolving said drum back to its normal position when the force rotating said drum ceases; a ratchet-wheel loosely mounted on said shaft; a dog so secured to said drum as to engage with the teeth of said ratchet and cause said ratchet to revolve with the drum by action of the waves, with a dog so secured to said frame as to engage with the ratchet-teeth also on said wheel, and prevent said wheel from revolving in more than one direction; a helical spring rigidly secured at its inner end to a sleeve rigidly secured to said shaft, and having its outer end secured to said ratchet wheel, said spring being arranged so that its tension in unwinding will revolve the shaft in the same direction of its revolution by said drum; and a cable passing through an aperture in said float, and having one end anchored in the water under the float with the upper end secured to said drum at such a point, that the waves will cause said rope to revolve said drum; a pulley suitably journaled in said frame; and suitable devices for transmitting power from said shaft to said pulley, and from said pulley to said dynamo, substantially as shown and described.

2. In a power transmitter, the combination of the dynamo S, with the shaft C journaled in the frame B; the drum D having the hub $d$; the helical spring E secured to hub $d$ and to the frame B; the ratchet-wheels F and G; the dog $f$ engaging with F, and the dog $g$ engaging with G; the spring H secured to G and shaft C; the cog-wheel I on the end of shaft C; pinion K meshing with I; shaft L; cog-wheel M; pinion N mounted on shaft O, on which is mounted balance-wheel P; and pulley R; belt $r$ connecting pulley R with the dynamo pulley; and the rope U secured to the drum D at one end, passing through the opening V in A, and secured by an anchor at the other end, all combined and arranged substantially as shown and described.

3. A series of floats A, having bumpers, and secured to each other by ropes $a^3$ secured to staple $a'$ in one float and passing over sheave $a^5$ in adjacent float; a frame B secured to said float with the shaft C journaled in said frame, with the drum D loosely mounted thereon; the helical spring E mounted on the hub of said drum; and the ratchet-wheels F and G; dogs $f$ and $g'$; helical spring H secured to ratchet G; and sleeve $h$; and pulley R mounted on shaft O, with suitable devices for conveying power from shaft C to pulley R; and belt $r$ connecting R with the pulley of the dynamo; and the rope U secured to drum D at one end, and to an anchor in the water under the float at the other, all combined and arranged substantially as shown and described.

JOHN A. JOHNSON.

Witnesses:
ALOYSIA HELMICH,
H. H. TALCOTT.